(12) United States Patent
Kim et al.

(10) Patent No.: US 11,487,580 B2
(45) Date of Patent: Nov. 1, 2022

(54) COMPUTATIONAL RESOURCE ALLOCATION IN ENSEMBLE MACHINE LEARNING SYSTEMS

(71) Applicant: Western Digital Technologies, Inc., San Jose, CA (US)

(72) Inventors: Yongjune Kim, San Jose, CA (US); Yuval Cassuto, Sunnyvale, CA (US); Robert Mateescu, San Jose, CA (US); Cyril Guyot, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 627 days.

(21) Appl. No.: 16/563,776

(22) Filed: Sep. 6, 2019

(65) Prior Publication Data

US 2021/0073036 A1 Mar. 11, 2021

(51) Int. Cl.
| | |
|---|---|
| *G06F 9/50* | (2006.01) |
| *G06F 13/16* | (2006.01) |
| *G06K 9/62* | (2022.01) |
| *G06N 3/04* | (2006.01) |
| *G06N 20/10* | (2019.01) |
| *G06N 3/08* | (2006.01) |
| *G06N 5/00* | (2006.01) |
| *G06N 20/20* | (2019.01) |

(52) U.S. Cl.
CPC ........ *G06F 9/5016* (2013.01); *G06F 13/1668* (2013.01); *G06K 9/6269* (2013.01); *G06K 9/6282* (2013.01); *G06N 3/04* (2013.01)

(58) Field of Classification Search
CPC .............................. G06N 3/088; G06N 20/00
See application file for complete search history.

(56) References Cited

U.S. PATENT DOCUMENTS

| | | | | |
|---|---|---|---|---|
| 9,607,246 | B2* | 3/2017 | Jebara ................... | G06N 20/00 |
| 2007/0112701 | A1* | 5/2007 | Chellapilla ............ | G06N 20/00 |
| | | | | 706/15 |
| 2014/0029840 | A1* | 1/2014 | Jebara .................. | G06K 9/6256 |
| | | | | 382/159 |
| 2018/0096595 | A1* | 4/2018 | Janzen .................... | G08G 1/04 |

(Continued)

FOREIGN PATENT DOCUMENTS

CN 101251896 6/2010

OTHER PUBLICATIONS

Hiromoto et al. A Specialized Processor Suitable for AdaBoost-Based Detection with Haar-like Features (2007).

(Continued)

*Primary Examiner* — Getente A Yimer
(74) *Attorney, Agent, or Firm* — Vierra Magen Marcus LLP

(57) ABSTRACT

A system and method for allocating computational resources includes a plurality of classifiers, a memory array, and a memory controller to allocate memory from the memory array to each of the plurality of classifier. The system and method also include an optimization processor to determine an optimized bit precision value for at least one of the plurality of classifiers based upon a relative importance of the plurality of classifiers. The memory controller allocates the memory from the memory array to the plurality of classifiers based upon the determined optimized bit precision value.

26 Claims, 5 Drawing Sheets

(56) References Cited

U.S. PATENT DOCUMENTS

2019/0102682 A1* 4/2019 Jayaraman ............. G06N 7/005
2020/0134461 A1* 4/2020 Chai ...................... G06N 3/088

OTHER PUBLICATIONS

Corpas et al. Acceleration and energy consumption optimization in cascading classifiers for face detection on low-cost ARM big.LITTLE asymmetric architectures (2018).

Zafar Takhirov., Designing energy-efficient computing systems using equalization and machine learning (2018).

Shoaran et al. Energy-Efficient Classification for Resource-Constrained Biomedical Applications (2018).

Sakr et al., "Analytical guarantees on numerical precision of deep neural networks," Proc. International Conference on Machine Learning (ICML), Aug. 2017.

Sakr et al., "Minimum Precision Requirements For the SVM-SGD Learning Algorithm," Proc. IEEE International Conference on Acoustics, Speech and Signal Processing (ICASSP), Mar. 2017.

Sakr et al., "Minimum precision requirements of general margin hyperplane classifiers," IEEE Journal on Emerging and Selected Topics in Circuits and Systems (JETCAS), vol. 9, No. 2, pp. 253-266, Apr. 2019.

* cited by examiner

COMPUTATIONAL RESOURCE ALLOCATION IN ENSEMBLE MACHINE LEARNING SYSTEMS

BACKGROUND

Applicant provides the following description to assist the understanding of the reader. None of the information provided or references cited is admitted to be prior art.

Machine learning algorithms are used in a wide variety of applications such as medical imaging, computer vision, advertising, gaming, etc. Machine learning algorithms use classifiers for mapping or classifying input data. Due to the currently used configuration of the classifiers, the accuracy of the classifiers in accurately predicting the classification is limited.

SUMMARY

In accordance with some aspects of the present disclosure, a system is disclosed. The system includes a plurality of classifiers, a memory array, and a memory controller to allocate memory from the memory array to each of the plurality of classifiers. The system also includes an optimization processor to determine an optimized bit precision value for at least one of the plurality of classifiers based upon a relative importance of the plurality of classifiers. The memory controller allocates the memory from the memory array to the plurality of classifiers based upon the determined optimized bit precision value.

In accordance with some other aspects of the present disclosure, a method is disclosed. The method includes determining, by an optimization processor associated with a memory controller, a relative importance of a plurality of classifiers, determining, by the optimization processor, an optimized bit precision value for at least one of the plurality of classifiers that are most important, and determining, by the optimization processor, an optimized amount of memory for each of the plurality of classifiers based on the optimized bit precision value. The method further includes allocating, by the memory controller, the optimized amount of memory from a memory array to each of the plurality of classifiers.

In accordance with yet other aspects of the present disclosure, a non-transitory computer-readable media having computer-readable instructions stored thereon is disclosed. The computer-readable instructions when executed by an optimization processor cause the optimization processor to determine a first optimized bit precision value for a first classifier of an adaptive boosting algorithm based upon minimizing a first mismatch probability of the first classifier, determine a second optimized bit precision value for a second classifier of the adaptive boosting algorithm based upon minimizing a second mismatch probability of the second classifier, allocate a first amount of computational resource to the first classifier based on the first optimized bit precision value, and allocate a second amount of computational resource to the second classifier based on the second optimized bit precision value. The first classifier is more important than the second classifier, the first optimized bit precision value is greater than the second optimized bit precision value, and the first amount of computational resource is greater than the second amount of computational resource.

In accordance with some other aspects of the present disclosure, a memory device is disclosed. The memory device includes a memory array and a memory controller to allocate memory from the memory array to each of a plurality of classifiers. The memory device also includes an optimization processor to determine an optimized bit precision value for at least one of the plurality of classifiers based upon a relative importance of the plurality of classifiers. The memory controller allocates the memory from the memory array to the plurality of classifiers based upon the determined optimized bit precision value.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
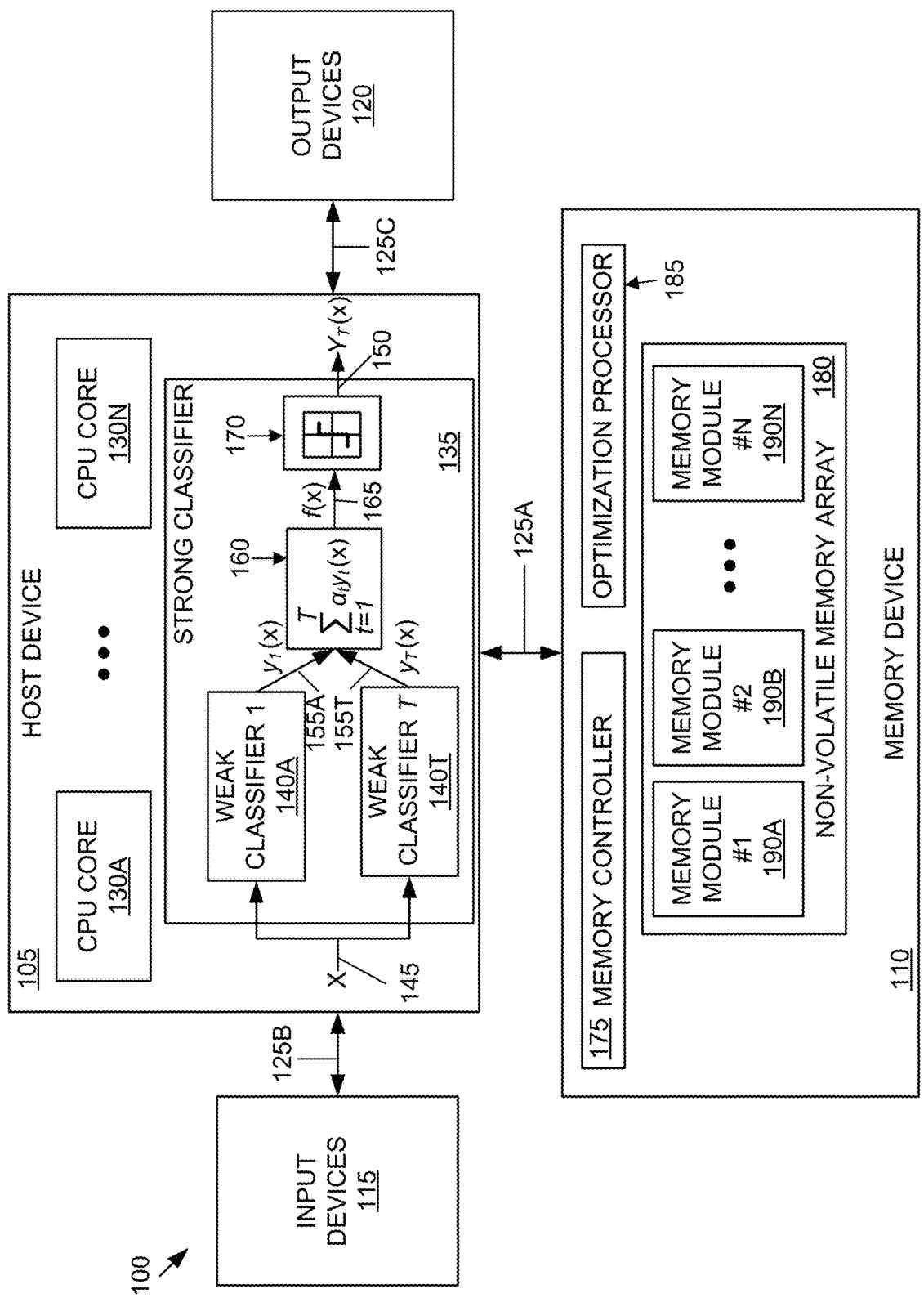
FIG. 1 is an example block diagram of an allocation system including a computing system implementing a boosting algorithm (e.g., Adaptive Boosting, LogitBoost, BrownBoost, etc.), in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Boosting is an ensemble machine learning technique that converts a plurality of weak classifiers into a strong classifier. A classifier is an algorithm that analyzes input data for predicting a class such as a target or category of the input data. In other words, a classifier may be used for classification purposes. For example, a classifier may be used to identify the presence of an object in an input image. As another example, a classifier may be used to identify whether an input email message is spam or not. Likewise, classifiers may be used in a wide variety of applications for predicting classifications. A classifier may be considered a weak classifier (or weak learner) if the classifier is only slightly correlated with the right classification, or in other words, its classification results are somewhat better than random guessing. A classifier may be considered a strong classifier (or strong learner) if that classifier is highly correlated with the right classification, or in other words, is able to classify more accurately than a weak classifier. Each weak classifier may be assigned a weight value. The weak classifier may be iteratively tested and trained using a set of training data (e.g., input data) to adjust the weight value assigned thereto based upon the error in the classification of that weak classifier.

Boosting algorithms may be of many types. Adaptive Boosting ("Adaboost") is one type of boosting algorithm that iteratively tests weak classifiers on a set of training data. After a weak classifier is tested on a set of training data, incorrect classifications are given a greater weight for testing with another weak classifier. By iteratively testing weak classifiers and adjusting the weight values based on the error of classification, Adaboost builds an accurate prediction model, leading to an overall optimized classifier. Along with weights, each weak classifier may also use a bias value that may be used to influence the output of a weak classifier. LogitBoost and BrownBoost are some other types of boosting algorithms.

The weight and bias values of a weak classifier are stored in a memory array. Since memory is a limited computational resource, in some cases, the amount of information that may be stored in the memory is limited. Memory is also needed for computation by the weak classifiers. Thus, in some cases, the size of the weight and bias values stored in the memory may be limited. In some cases, the size may be limited by fixing the number of bits that may be used to store the weights and the bias values. This number of bits is called the "bit precision" of the weight and bias values. For example, in the Adaboost algorithm, the bit precision of the weight and bias values for all weak classifiers may be predefined. The same or uniform bit precision may be used for all the weak classifiers. The size of weight and bias values may be adjusted to achieve the defined bit precision. For example, if a weight value requires thirty two bits, and the bit precision is defined to be sixteen bits, the thirty two bit weight value may be adjusted into a sixteen bit value. Adjusting the size of the weight and bias values to achieve the predefined bit precision results in a loss of data accuracy. Specifically, by adjusting the size of the weight and bias values to satisfy the bit precision, the output of classification from the associated weak classifier is less accurate.

One mechanism to counteract the impact of predefined bit precision is to use a larger memory to allow larger sized weight and bias values to be stored. However, using a larger memory is not always feasible and the larger memory may still be inadequate depending upon the number of weak classifiers that are part of the Adaboost algorithm. The present disclosure provides an improved mechanism to counteract the impact of bit precision. The present disclosure provides technical solutions to allocate memory to each weak classifier of a boosting algorithm (e.g., the Adaboost algorithm) based upon a relative importance of that classifier. Thus, the bit precision of the weight and bias values of each of the weak classifiers may be non-uniform based on the relative importance of those weak classifiers.

The present disclosure determines an optimized bit precision value for one or more of the most important weak classifiers of the boosting algorithm, and determines an optimized memory allocation for each weak classifier based on the optimized bit precision values. By computing memory allocation based on optimized bit precision values, the present disclosure ensures that more important weak classifiers have greater bit precision than lesser important classifiers, and that the limited amount of memory is optimally allocated. By allocating a greater bit precision, and therefore, greater memory to more important weak classifiers, the impact on the loss of data accuracy is reduced. Specifically, since the most important weak classifiers have the greatest impact on the accuracy of the overall classification, by allocating greater bit precision values and greater memory to most important weak classifiers, the accuracy of the overall classification may be increased.

Although the present disclosure is described with respect to the Adaboost algorithm, the present disclosure may be used in other boosting techniques or ensemble machine learning algorithms.

Referring now to FIG. 1, an example block diagram of an allocation system 100 is shown, in accordance with some embodiments of the disclosure. The allocation system 100 includes a computing system or host device 105 associated with a memory device 110. The host device 105 may be configured to receive input from one or more input devices 115 and provide output to one or more output devices 120. The host device 105 may be configured to communicate with the memory device 110, the input devices 115, and the output devices 120 via appropriate interfaces 125A, 125B, and 125C, respectively. The allocation system 100 may be implemented in a variety of computing devices such as computers (e.g., desktop, laptop, servers, data centers, etc.), tablets, personal digital assistants, mobile devices, wearable computing devices such as smart watches, other handheld or portable devices, or any other computing unit suitable for performing operations using the host device 105.

The input devices 115 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 105 and that allows an external source, such as a user, to enter information (e.g., data) into the host device and send instructions to the host device. Similarly, the output devices 120 may include a variety of output technologies such as external memories, printers, speakers, displays, microphones, light emitting diodes, headphones, plotters, speech generating devices, video devices, global positioning systems, and any other output peripherals that are configured to receive information (e.g., data) from the host device 105. The "data" that is either input into the host device 105 and/or output from the host device may include any of a variety of textual data, graphical data, video data, sound data, position data, combinations thereof, or other types of analog and/or digital data that is suitable for processing using the allocation system 100.

The host device 105 may include or be associated with one or more processing units/processors, such as Central Processing Unit ("CPU") cores 130A-130N. Each of the CPU cores 130A-130N may be configured to execute instructions for running one or more applications of the host device 105. In some embodiments, the instructions and data needed to run the one or more applications may be stored within the memory device 110. The host device 105 may also be configured to store the results of running the one or more applications within the memory device 110. Thus, the host device 105 may be configured to request the memory device 110 to perform a variety of operations. For example, the host device 105 may request the memory device 110 to read data, write data, update or delete data, and/or perform management or other operations.

One such application running on the host device 105 may implement a boosting (e.g., Adaptive Boosting ("Adaboost")) algorithm 135. For example, the host device 105 may implement the boosting algorithm 135 by executing instructions for the boosting algorithm in one or more of the CPU cores 130A-130N. The boosting algorithm 135, such as Adaboost, is an ensemble machine learning algorithm that combines the results of multiple weak classifiers 140A-140T in a linear combination to obtain a single result that is overall more accurate than the individual results of the weak classifiers. Thus, the boosting algorithm 135 is a stronger or more optimized classifier than the weak classifiers 140A-140T. The boosting algorithm 135, and particularly the Adaboost algorithm, receives an input data 145 to generate an output 150. The input data 145 may be received from the input devices 115 via the interface 125B and the output may be sent to the output devices 120 via the interface 125C. The input data 145 may be provided as input to each of the weak classifiers 140A-140T. The weak classifiers 140A-140T may be any of a variety of types of classifiers that may be suitable for use with the boosting algorithm 135. For example, in some embodiments, one or more of the weak classifiers 140A-140T may be decision tree classifiers (e.g., decision stumps), single layer classifiers such as single layer neural networks (e.g., perceptrons) or support vector machines, multiple-layer classifiers such as deep neural networks, etc. In other embodiments, other or additional types of weak classifiers may be used for the weak classifiers 140A-140T. Further, in some embodiments, each of the weak classifiers 140A-140T may be the same type of weak classifier, while in other embodiments, at least some of the weak classifiers may be of different types.

Each of the weak classifiers 140A-140T receives the input data 145 to generate intermediate results 155A-155T, respectively. The intermediate results 155A-155T may be combined in a linear combination block 160 to obtain a second intermediate result 165, which may implement the following Equation:

$$f(x) = \left( \sum_{t=1}^{T} \alpha_t y_t(x) \right)$$

where:
f(x)=the second intermediate result 165
X=the input data 145;
$\alpha_t$=Nonnegative coefficient;
$y_t(x) \in \{+1, -1\}$=Decision or the intermediate results 155A-155T of each of the weak classifiers Thus, the second intermediate result 165 computes a summation of each of the intermediate results 155A-155T. Each of the intermediate results 155A-155T may be computed as a product of the input data 145 and the respective weight value associated with the weak classifiers 140A-140T. For example, the intermediate result 155A of the weak classifier 140A may be computed as the product of the input data 145 and a weight value assigned to the weak classifier 140A. Similarly, the intermediate results 155B-155T may be computed and input into the linear combination block 160 for summation.

The second intermediate result 165 may be input into a sign function block 170 that is configured to implement a mathematical function that extracts the sign of a real number. Specifically, the sign function block 170 may implement the following mathematical function to obtain the output 150:

$$Y_T(x) = \text{sign}(\Sigma_{t+1}{}^T \alpha_t y_t(x)) \qquad \text{Equation I}$$

where:
$Y_T(x)$=the output 150
$\Sigma_t + \alpha_t y_t(x)$=the second intermediate result 165

Thus, the boosting algorithm 135 combines the results of the weak classifiers 140A-140T to obtain the output 150. Each round or cycle of processing the input data 145 by the boosting algorithm 135 to obtain the output 150 is referred to herein as a workload. For example, the processing of first input data (e.g., the input data 145) to receive first output (e.g., the output 150) is a first workload, the processing of second input data to receive second output is a second workload, etc.

Referring still to FIG. 1, the memory device 110 includes a memory controller 175 that is configured to read data from or write data to a memory array 180, and an optimization processor 185 to determine an optimized memory allocation for each of the weak classifiers 140A-140T. The memory array 180 may include one or more memory modules such as memory modules 190A-190N. Each of the memory modules 190A-190N may include any of a variety of volatile and/or non-volatile memory types. For example, in some embodiments, one or more of the memory modules 190A-190N or portions thereof may include NAND flash memory cores. In other embodiments, one or more of the memory modules 190A-190N or portions thereof may include NOR flash memory cores, Static Random Access Memory (SRAM) cores, Dynamic Random Access Memory (DRAM) cores, Magnetoresistive Random Access Memory (MRAIVI) cores, Phase Change Memory (PCM) cores, Resistive Random Access Memory (ReRAM) cores, 3D) (Point memory cores, ferroelectric random-access memory (FeRAM) cores, and other types of memory cores that are suitable for use within the memory array 180. In some embodiments, one or more of the memory modules 190A-190N or portions thereof may be configured as other types of storage class memory ("SCM"). Further, each of the memory modules 190A-190N may be implemented as a single in-line memory module or a dual in-line memory module.

The memory modules 190A-190N may be individually and independently controlled by the memory controller 175. In other words, the memory controller 175 may be configured to communicate with each of the memory modules 190A-190N individually and independently. By communicating with the memory modules 190A-190N, the memory controller 175 may be configured to read data from or write data to one or more of the memory modules in response to instructions received from the host device 105. The memory controller 175 and the optimization processor 185 may be situated on the same die as the memory array 180 or on a different die. Although shown as being part of the memory device 110, in some embodiments, the memory controller 175 and/or the optimization processor 185 may be part of the host device 105 or part of another component of the allocation system 100 and associated with the memory device. The memory controller 175 is also configured to allocate memory from the memory modules 190A-190N to each of the weak classifiers 140A-140T of the boosting algorithm 135 based upon an indication from the optimization processor 185. The memory controller 175 and/or the optimization processor 185 may be implemented as a logic circuit in either software, hardware, firmware, or combination thereof to perform the functions described herein. For example, in some embodiments, the memory controller 175 and/or the optimization processor 185 may be configured to execute computer-readable instructions stored in the memory device 110. The memory controller 175 and/or the optimization processor 185 may be integrated into a single processor or controller.

To facilitate execution of the boosting algorithm 135, the memory controller 175 may reserve space in the memory modules 190A-190N for each of the weak classifiers 140A-140T. The reserved memory space serves as a dedicated memory or dedicated computational resource for the weak classifiers 140A-140T for the duration of the computation in the weak classifiers. Once the computation in the weak classifiers 140A-140T is complete, the reserved memory space is released for use by the next workload. In some embodiments, the amount of memory in the reserved memory space that is allocated to each of the weak classifiers 140A-140T may impact the accuracy of the intermediate results 155A-155T, respectively, that are generated from each of the weak classifiers.

The weak classifiers 140A-140T are "noisy" classifiers in that the intermediate results 155A-155T generated from each of those weak classifiers include an error component. In other words, the intermediate results 155A-155T generated from each of the weak classifiers 140A-140T may be represented as follows:

$$\text{Intermediate result of noisy weak classifier}, \hat{y}_t = y_t + n_t \quad \text{Equation II}$$

where:

$y_t$=the intermediate result of a noiseless or ideal weak classifier; and $n_t$=noise or error associated with each weak classifier The noise component in each of the weak classifiers 140A-140T may be due to the limited computational resources such as memory allocated to those weak classifiers. As discussed above, each of the weak classifiers 140A-140T may be assigned a weight value and a bias value. These weight and bias values may be stored within one or more of the memory modules 190A-190N. Depending upon the total amount of memory available in the memory modules 190A-190N and the amount of memory reserved for storing the weight and bias values, the size of the weight and bias values may be restricted by defining or limiting a bit precision value. "Bit precision" or simply "precision" as used herein means the number of bits that are used to store a particular data. In some embodiments, the bit precision of each of the weak classifiers 140A-140T may be pre-defined. Defining the bit precision of a weak classifier means defining the size of the weight value and the size of the bias value of that weak classifier.

To achieve the predefined bit precision, the size of the weight and bias values may be adjusted (e.g., by truncating, rounding, etc.). By adjusting the size of the weight and bias values to achieve the bit precision, the number of bits needed to store the weight and bias values may be reduced, thereby reducing the amount of memory needed for storing the weight and bias values. However, reducing the size of the weight and bias values may lead to some loss in computational accuracy. This loss in computational accuracy may be manifested as the noise mentioned above. Although the present disclosure has been described in terms of bit precision of the weight and bias values of the weak classifiers 140A-140T, the present disclosure may be applied to any data or signal of the weak classifiers that may be impacted by the predefined bit precision and may benefit from an optimized bit precision value, as discussed herein.

In some embodiments, the noise or error due to limited or predefined bit precision may be expressed in terms of a mismatch probability between an output (e.g., the intermediate results 155A-155T) of an ideal memory allocation (or other computational resource) and an output of an actual memory allocation. An ideal memory allocation may be defined as the ideal amount of memory that is needed by a particular one of the weak classifiers 140A-140T to generate a noiseless intermediate result (e.g., the intermediate results 155A-155T), or in other words, the noise component, $n_t$, in Equation II above is zero. An actual memory allocation may be defined as the actual amount of memory that is allocated to a particular one of the weak classifiers 140A-140T, or in other words, the intermediate result of that particular weak classifier includes the noise component, $n_t$, as shown in Equation II above. Thus, the mismatch probability of a particular weak classifier, t, may be defined as:

$$p_{miss,t} = P(y_t \neq \bar{y}_t) \quad \text{Equation III}$$

where:

$y_t$ is the intermediate result of an actual memory allocation of a weak classifier, t; and $\bar{y}_t$ is the intermediate result of an ideal memory allocation of the weak classifier, t.

Similarly, the overall mismatch probability between the output 150 of an ideal memory allocation and the output of an actual memory allocation may be defined as:

$$p_{miss} = P(Y_T(x) \neq \bar{Y}_T(x)) \quad \text{Equation IV}$$

where:

$Y_T(x)$ is the output 150 of an actual memory allocation in each of the weak classifiers 140A-140T; and $\bar{Y}_T(x)$ is the output 150 of an ideal memory allocation in each of the weak classifiers 140A-140T.

Further, using Equation I above, the output 150 of an ideal memory allocation may be defined as:

$$\bar{Y}_T(x) = \text{sign}(\Sigma_{t=1}^T \alpha_t \bar{y}_t(x)) \quad \text{Equation V}$$

Assuming, $\hat{y}_t = y_t \eta_t$ where $\eta_t \in \{+1, -1\}$ and defines the noise associated with an actual memory allocation of a weak classifier, t, Equation V may be rewritten as:

$$\bar{Y}_T(x) = \text{sign}(\Sigma_{t=1}^T \alpha_t \eta_t y_t(x)) = \text{sign}(\Sigma_{t=1}^T \beta_t y_t(x)) \quad \text{Equation VI}$$

where: $\beta_t = \alpha_t \eta_t$

By minimizing the mismatch probability of Equation IV above, output from an actual memory allocation may be made to simulate the output achieved with an ideal memory allocation:

$$\min p_m = P(Y_T(x) \neq \hat{Y}_T(x)) \approx \Sigma_{t=1}^T \alpha_t P(y_t P(y_t \neq \hat{y}_t)$$
$$= \Sigma_{t=1}^T \alpha_t p_{miss,t} \quad \text{Equation VII}$$

Or $$\min p_m \approx \min \Sigma_{t=1}^T -1) p_{miss,t} \quad \text{Equation VIII}$$

Or $$\min p_m \approx \min \Sigma_{t=1}^T \alpha_t^2 p_{miss,t} \quad \text{Equation IX}$$

Or $$\min p_m \min \Sigma_{t=1}^T c(\alpha_t) p_{miss,t} \quad \text{Equation X}$$

Equation VIII is obtained by replacing $\alpha_t$ in Equation VII with $e^{s\alpha_t}-1$ (where s may be any positive value), Equation IX is obtained by replacing $\alpha_t$ in Equation VII with $\alpha_t^2$, and Equation X is obtained by replacing $\alpha_t$ in Equation VII with an arbitrary cost function $c(\alpha_t)$, which is a non-decreasing function of $\alpha_t$.

As indicated above, the limited bit precision may lead to a mismatch probability. By minimizing the mismatch probability, the noise in the output 150 attributable to the limited bit precision may be reduced. In existing techniques, the bit precision is pre-defined and the same bit precision is used for all of the weak classifiers 140A-140T. Moreover, each of the weak classifiers 140A-140T is allocated the same amount of memory from the memory modules 185A-185N. Thus, by using the same bit precision and by allocating the same amount of memory to each of the weak classifiers 140A-140T, such existing techniques ignore the relative importance of the weak classifiers. The impact of the more important weak classifiers 140A-140T on the accuracy of the output 150 may be greater than the impact of the lesser important weak classifiers. Thus, by reducing noise in the more important weak classifiers 140A-140T, the accuracy of the output 150 may be increased.

In some embodiments, the optimization processor 185 may determine the relative importance of the weak classifiers 140A-140T based on their respective weights. For example, in some embodiments, those ones of the weak classifiers 140A-140T having a larger weight may be considered more important than the weak classifiers having a smaller weight. In other embodiments, the type of the weak classifiers 140A-140T may be used to identify the more important weak classifiers. For example, in some embodiments, decision tree weak classifiers may be considered more important than neural network weak classifiers. In other embodiments, deep neural networks may be considered more important than single layer neural networks. In yet other embodiments, other or additional criterion may be used to determine which ones of the weak classifiers 140A-140T are more important than other weak classifiers. By identifying the relative importance of the weak classifiers 140A-140T, the optimization processor 185 may selectively reduce the noise associated with the weak classifiers.

To selectively reduce the noise of the weak classifiers 140A-140T, the optimization processor 185 may compute an optimized bit precision value for at least some of the weak classifiers. For example, the optimization processor 185 may compute optimized bit precision values for one or more of the most important ones of the weak classifiers 140A-140T. By optimizing the bit precision value of at least some of the weak classifiers 140A-140T (e.g., of the most important weak classifiers), the mismatch probability discussed above for those weak classifiers may be reduced, leading to the output 150 that is more accurate.

In some embodiments, the bit precision of the weak classifiers 140A-140T may be optimized by formulating an optimization problem that minimizes an upper bound on the mismatch probability. Specifically, using Equation VII above, the optimization problem to achieve an optimized bit precision may be defined as:

$$\underset{B_A, B_W}{\text{minimize}} \sum_{t=1}^{T} \alpha_t UB(p_{miss,t}) \qquad \text{Equation XI}$$

$$\text{subject to } \sum_{t=1}^{T} B_{A,t} \leq B_{A,Total},$$

$$\sum_{t=1}^{T} B_{W,t} \leq B_{W,Total}$$

where:

$B_A$ = bit precision of activation (or data) value of a particular one of the weak classifiers $1040A - 140T = (B_{A,1}, \ldots, B_{A,T})$ $B_W$ = bit precision of the weight of a particular one of the weak classifiers $140A - 140T = (B_{W,1}, \ldots, B_{W,T})$ $B_{A,Total}$=total or maximum number of activation bits for all the weak classifiers combined.

Simply as an example and without intending to be limiting in any way, in some embodiments, $B_{A,Total}$ may be one hundred bits for three weak classifiers (e.g., T=3), and the first weak classifier (e.g., $\alpha 1$) may be more important than the second weak classifier (e.g., $\alpha 2$), which in turn may be more important than the third weak classifier (e.g., $\alpha 3$). Then, the first weak classifier may be allocated a greater bit precision than the second weak classifier, and the second weak classifier may be allocated a greater weight precision than the third weak classifier. Thus, for example, the first weak classifier may be allocated a bit precision, $B_{A,1}$ of fifty, the second weak classifier may be allocated a bit precision, $B_{A,2}$, of thirty, and the third weak classifier may be allocated a bit precision, $B_{A,3}$, of twenty. However, the combined bit precision of the three weak classifiers combined in the example above may not exceed one hundred bits. The values of fifty, thirty, and twenty above may be determined by solving Equation XI above.

Similarly, the optimization problem using Equation VIII may be defined as:

$$\underset{B_A, B_W}{\text{minimize}} \sum_{t=1}^{T} (e^{s\alpha_t} - 1)UB(p_{miss,t}) \qquad \text{Equation XII}$$

$$\text{subject to } \sum_{t=1}^{T} B_{A,t} \leq B_{A,Total}, \sum_{t=1}^{T} B_{W,t} \leq B_{W,Total}$$

The optimization problem using Equation IX may be defined as:

$$\min p_m \approx \min \sum_{t=1}^{T} (e^{s\alpha_t} - 1) p_{miss,t} \qquad \text{Equation XIII}$$

$$\text{subject to } \sum_{t=1}^{T} B_{A,t} \leq B_{A,Total}, \sum_{t=1}^{T} B_{W,t} \leq B_{W,Total}$$

And, the optimization problem using Equation X above may be defined as:

$$\underset{B_A, B_W}{\text{minimize}} \sum_{t=1}^{T} c(\alpha_t) UB(p_{miss,t}) \qquad \text{Equation XIV}$$

$$\text{subject to } \sum_{t=1}^{T} B_{A,t} \leq B_{A,Total}, \sum_{t=1}^{T} B_{W,t} \leq B_{W,Total}$$

The function $UB(p_{miss,t})$ in Equations XI, XII, XIII, and XIV above may be solved based upon the type of the weak classifiers 140A-140T. For example, for a linear support vector machine or a single neural network, the function $UB(p_{miss,t})$ may be solved as:

$$p_{miss,t} \leq \frac{1}{24}\left(\Delta_{A,t}^2 \|w\|^2 \mathbb{E}\left[\frac{1}{|w^T X + b|}\right] + \Delta_{W,t}^2 \mathbb{E}\left[\frac{\|X\|^2 + 1}{|w^T X + b|}\right]\right) \quad \text{Equation XV}$$

where:
w=weight;
$\Delta_{A,t} = 2^{-(B_A-1)}$=bit precision of the bias value of a particular one of the weak classifiers 140A-140T
$\Delta_{w,t} = 2^{-(B_w-1)}$=bit precision of the weight of a particular one of the weak classifiers 140A-140T.
b=bias value
E( )=mean value Additional details for solving Equation XV may be found in Sakr et al., "Minimum Precision Requirements For the SVM-SGD Learning Algorithm," Proc. IEEE International Conference on Acoustics, Speech and Signal Processing (ICASSP), March 2017 and Sakr et al., "Minimum precision requirements of general margin hyperplane classifiers," IEEE Journal on Emerging and Selected Topics in Circuits and Systems (JETCAS), Vol. 9, No. 2, PP. 253-266, April 2019, the entireties of which are incorporated by reference herein.

Similarly, for a deep neural network, the function $UB(p_{miss,t})$ in Equations XI, XII, XIII, and XIV above may be solved as follows:

$$P_{miss,t} \leq \Delta_{A,t} E_{A,t} + \Delta_{W,t}^2 E_{W,t} \quad \text{Equation XVI}$$

where:
$E_{A,t}$ and $E_{W,t}$ are variables that may be calculated by using a backpropagation algorithm that is used for training neural networks and deep learning networks.

Additional details for solving Equation XVI may be found in Sakr et al., "Analytical guarantees on numerical precision of deep neural networks," Proc. International Conference on Machine Learning (ICML), August 2017, the entirety of which is incorporated by reference herein.

By solving Equations XV and XVI, the optimized bit precision value for a particular one of the weak classifiers 140A-140T that minimizes the mismatch probability of that particular one of the weak classifiers may be determined. Upon determining the optimized bit precision value for a particular one of the weak classifiers 140A-140T, an optimized memory allocation may be determined based upon the optimized bit precision.

Thus, in allocating the memory to each of the weak classifiers 140A-140T, the optimization processor 185 determines the optimized bit precision values for one or more of the weak classifiers for determining the optimized memory allocation based on the optimized bit precision.

It is to be understood that only some components of the allocation system 100 are shown and described in FIG. 1. However, the allocation system 100 may include other components such as various batteries and power sources, networking interfaces, routers, switches, external memory systems, controllers, etc. Generally speaking, the allocation system 100 may include any of a variety of hardware, software, and/or firmware components that are needed or considered desirable in performing the functions described herein. Similarly, the host device 105, the input devices 115, the output devices 120, and the memory device 110 including the memory controller 175, the memory array 180, and the optimization processor 185 may include other hardware, software, and/or firmware components that are considered necessary or desirable in performing the functions described herein. In addition, in certain embodiments, the memory device 110 may integrate some or all of the components of the host device, including, for example, the CPU cores 130A-130N, and the CPU cores may implement the boosting algorithm 135, as described above.

Figure 2:
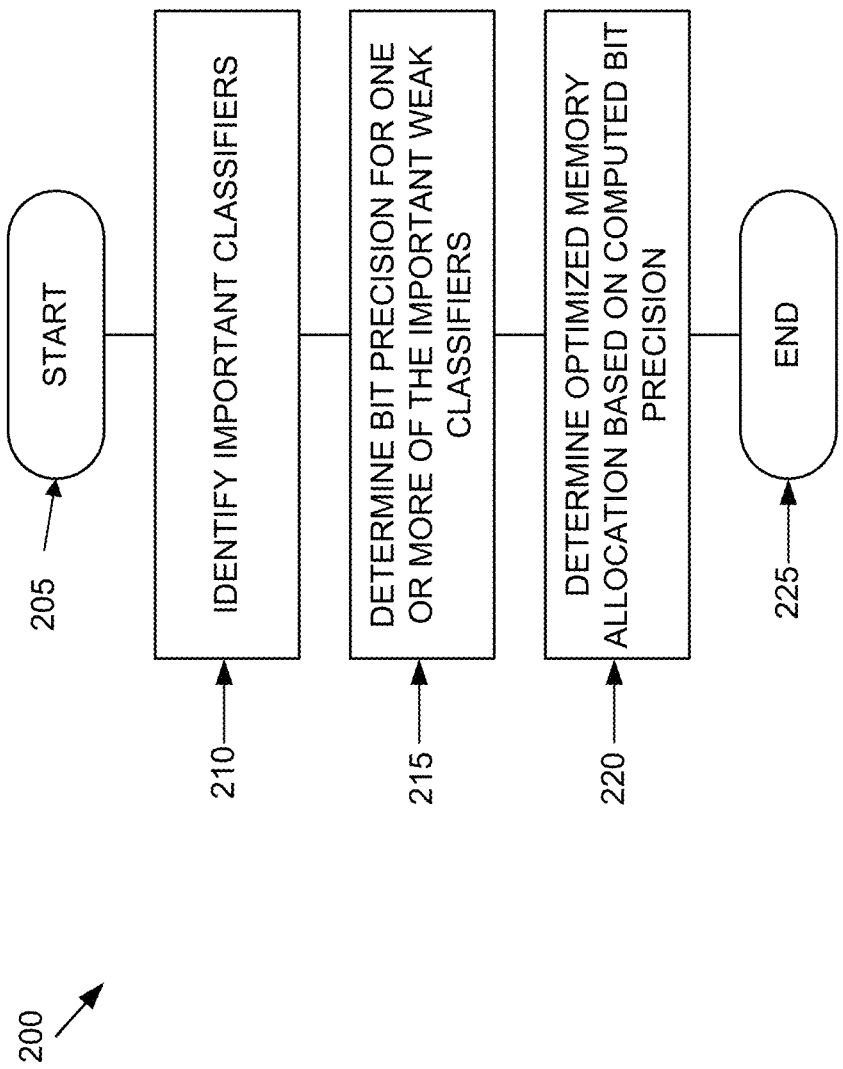
FIG. 2 is an example flowchart outlining operations performed by the allocation system of FIG. 1 for allocating computational resources to classifiers of the boosting algorithm of FIG. 1, in accordance with some embodiments of the present disclosure.

Turning now to FIG. 2, an example flowchart outlining operations of a process 200 is shown, in accordance with some embodiments of the present disclosure. The process 200 may include additional or other operations depending upon the particular embodiment. The process 200 may be implemented by the optimization processor 185. By implementing the process 200, the optimization processor 185 may determine an optimized bit precision value for one or more of the weak classifiers 140A-140T and allocate memory from the memory modules 190A-190N based upon the optimized bit precision value.

The process 200 starts at operation 205 when optimized bit precision values are to be determined. In some embodiments, new optimized bit precision values may be determines for each new workload (e.g., the input data 145) that is received at the boosting algorithm 135. In other embodiments, new optimized bit precision values may be determined after every predetermined number of workloads. In yet other embodiments, new optimized bit precision values may be determined when a weight or bias of one or more of the weak classifiers 140A-140T has been adjusted. In some embodiments, new optimized bit precision values may be determined when the list of the weak classifiers 140A-140T making up the boosting algorithm 135 is changed. In other embodiments, new optimized bit precision values may be determined when other or additional predetermined criteria is met.

At operation 210, the optimization processor 185 identifies the most important weak classifiers from the weak classifiers 140A-140T for computing optimized bit precision values. In some embodiments, the memory controller 175 may sort the weak classifiers 140A-140T by their respective weights, such that the weak classifiers having the highest weight are considered the most important and the weak classifiers having the lowest weight are considered the least important. In other embodiments, the memory controller 175 may be configured to use other criteria to identify the most important weak classifiers.

At operation 215, the optimization processor 185 determines the optimized bit precision value for one or more of the weak classifiers 140A-140T. In some embodiments, the memory controller 175 may determine the optimized bit precision value for each of the weak classifiers 140A-140T. In other embodiments, the memory controller 175 may determine the optimized bit precision value for one or more of the most important ones of the weak classifiers 140A-140T. For example, the memory controller 175 may determine the optimized bit precision for a predetermined number of the weak classifiers 140A-140T that are the most important. As an example, the memory controller 175 may be programmed to identify the top ten most important weak classifiers and determine the optimized bit precision value for those ten weak classifiers. The remaining weak classifiers for which the optimized bit precision value is not determined may maintain or be assigned a default bit precision value. In some embodiments, each of the weak classifiers 140A-140T may have a default bit precision value. If an optimized bit precision value is computed for a particular one of the weak classifiers 140A-140T, the default bit precision value of that particular weak classifier may be replaced by the optimized bit precision value.

The optimization processor 185 may compute the optimized bit precision value for a particular one of the weak classifiers 140A-140T by minimizing the mismatch probability of that weak classifier. The optimization processor 185 may be configured to implement and solve Equations XI-XIV above to determine the optimized bit precision value for a particular one of the weak classifiers 140A-140T. Further, in some embodiments, the optimized bit precision value may be based upon the relative importance of the weak classifiers 140A-140T. For example, if the relative importance of the weak classifiers 140A-140T is based on their respective weights, then the optimized bit precision value may be such that the optimized bit precision value for a larger weight is larger than the optimized bit precision value for a smaller weight. Specifically, if weight of weak classifier 1 is greater than the weight of weak classifier 2, which is in turn greater than the weight of weak classifier 3, then the optimized bit precision value of weak classifier 1 is greater than or equal to the optimized bit precision value of weak classifier 2, which in turn is greater than or equal to the optimized bit precision value of weak classifier 3. Further, in some embodiments, the optimized bit precision value that is computed for a particular one of the weak classifiers 140A-140T may be used for both the weight and bias values of that weak classifier, as well as for other data or signals that are impacted by bit precision. In some embodiments, separate bit precision values may be computed, using Equations XI, XII, XII, and XIV above, for the weight and bias values.

At operation 220, the optimization processor 185 determines an optimized memory allocation for each of the weak classifiers 140A-140T based upon the optimized bit precision values determined at the operation 215. In those embodiments in which the optimization processor 185 computes the optimized bit precision values for each of the weak classifiers 140A-140T, the optimization processor may determine the optimized memory allocation for each of the weak classifiers based upon the optimized bit precision values. In those embodiments in which the optimization processor 185 computes the optimized bit precision values for a subset of the weak classifiers 140A-140T (e.g., one or more of the most important weak classifiers), the optimization processor may compute the optimized memory allocation for that subset of the weak classifiers. For the remaining ones of the weak classifiers 140A-140T, the optimization processor 185 may determine the amount of memory left after the optimized memory allocation for the one or more of the most important weak classifiers has been made. The optimization processor 185 may then determine an optimized memory allocation for the remaining weak classifiers based on the amount of memory left. In some embodiments, the optimization processor 185 may allocate a designated amount of memory to each of the remaining weak classifiers or divide the remaining amount of memory equally between the remaining weak classifiers. In other embodiments, the optimization processor 185 may use other predetermined criteria to compute the optimized memory allocations for the remaining weak classifiers.

In some embodiments, the optimization processor 185 may maintain a look-up table to determine the optimized memory allocation for each of the weak classifiers 140A-140T. The input to the look-up table may be the optimized bit precision value and the output may be the optimized memory allocation corresponding to the optimized bit precision. Thus, in some embodiments, the optimized memory allocation for each optimized bit precision value may be predetermined and saved in the look-up table. In other embodiments, the optimization processor 185 may use other mechanisms to determine the optimized memory allocation for each optimized bit precision value.

In some embodiments, the optimized memory allocation may correspond to the amount of memory that is needed to store the number of bits indicated in the optimized bit precision value of data, weight, and other internal signals of a particular one of the weak classifiers 140A-140T. For example, if the optimized bit precision value for a particular one of the weak classifiers 140A-140T is determined to be thirty two bits, the memory controller 175 may determine the appropriate amount of memory that is needed to store thirty two bits of data and allocate memory based upon that determination. In other embodiments, the optimization processor 185 may use other mechanisms to determine the optimum amount of memory to allocate to the weak classifiers 140A-140T. Further, the amount of memory that is allocated is greater for a greater optimized bit precision value. For example, if the optimized bit precision value for a first weak classifier is thirty two bits and the optimized bit precision value for a second weak classifier is eight bits, the amount of memory allocated to the first weak classifier is greater than the amount of memory allocated to the second weak classifier (since the first weak classifier has a larger bit precision value than the second weak classifier). If, in some embodiments, the total amount of memory allocated becomes greater than the actual amount of memory available, the memory allocation of the least important weak classifier(s) may be ignored.

By determining the optimized bit precision values for at least a subset of the weak classifiers 140A-140T, and by computing optimized memory allocations based upon the optimized bit precision values, the optimization processor 185 reduces the noise associated with the most important ones of the weak classifiers that have the most impact on the accuracy of the intermediate results 155A-155N, thereby increasing the overall accuracy of the output 150. The optimization processor 185 may convey the optimized memory allocations to the memory controller 175, which may then allocate the memory from the memory modules 190A-190N in accordance with the optimized memory allocation received from the optimization processor. The process 200 ends at operation 225.

Additionally, although the process 200 is discussed with respect to memory allocation, in other embodiments, the process 200 may also be used for determining an optimum allocation of other computing resources, such as processing unit, power consumption, etc.

Figure 3:
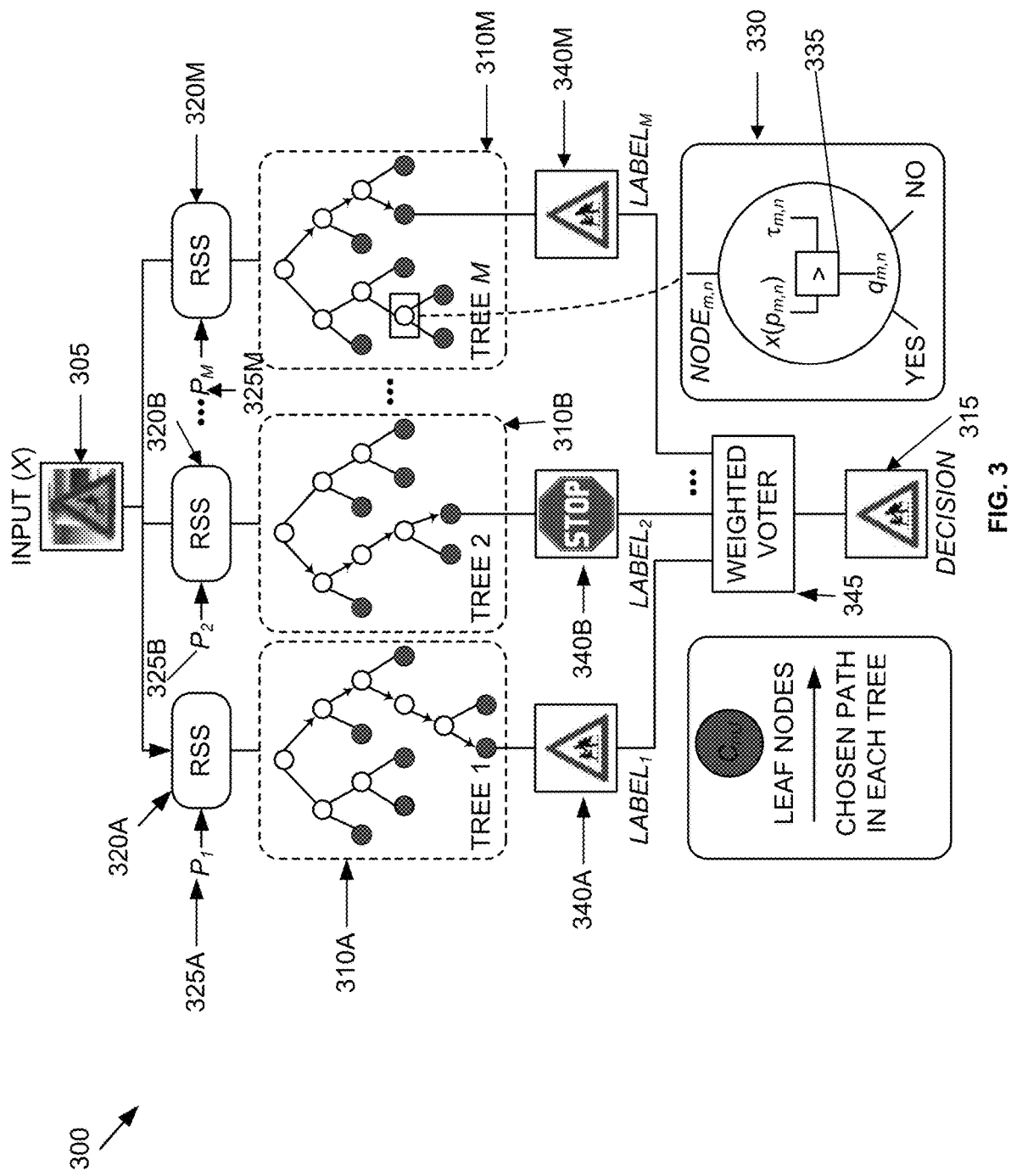
FIG. 3 is an example block diagram of a decision tree classifier of the boosting algorithm of FIG. 1, in accordance with some embodiments of the present disclosure.

Referring now to FIG. 3, an example decision tree system 300 is shown, in accordance with some embodiments of the present disclosure. The decision tree system 300 may be used as one or more of the weak classifiers 140A-140T in the Boosting algorithm 135 of FIG. 1. It is to be understood that the decision tree system 300 is only an example and the configuration of the decision tree may vary in other embodiments. Generally speaking, any type of decision tree that is considered suitable for the Boosting algorithm 135 may be used. As discussed above, the optimization processor 185 may determine the relative importance of multiple weak classifiers (e.g., the weak classifiers 140A-140T) for computing the optimized bit precision values and the optimized memory allocations. In some embodiments, the optimized bit precision values and optimized memory allocations may be determined between various weights, bias values, etc. within a single weak classifier also. For example, the decision tree system 300 includes input data 305 that is input into a plurality of decision trees 310A-310M to obtain an output 315. The present disclosure may be used to compute the relative importance of the various decision trees 310A-310M, and determine optimized bit precision values and optimized memory allocation based on that relative importance.

The input data 305 may be pre-processed by performing Random Sub-Sampling ("RSS") operation 320A-320M using a pseudorandom pattern vector, P, 325A-325M. The result of each of RSS operations 320A-320M may be input into a corresponding one of the decision trees 310A-310M. Each of the decision trees 310A-310M may include a plurality of nodes, only one which is marked by reference numeral 330 and shown in greater detail in FIG. 3. Each of the decision trees 310A-310M may include a maximum of N nodes. Each of the nodes 330 receives one input and generates two branches (left branch and right branch) as output. The branch that is pursued is based upon the result of the node 330. Specifically, each of the node 330 includes a comparator 335 that compares data, X(Pm,n), with a threshold, Tm,n, to obtain a node result Qm.n. Based upon the value of Qm,n, either the left branch or the right branch of the node is pursued to the next node. Thus, Qm,n is input as X(Pm,n) to the next node that is selected. Pm,n is an index that identifies an nth node in an mth decision tree of the decision trees 310A-310M. The above process of comparing using the comparator 335 in each of the decision trees 310A-310M is repeated until a leaf node is reached in each decision tree. The result of the leaf node of each of the decision trees 310A-310M forms the overall result of that decision tree and is represented by a label 340A-340M.

Each of the labels 340A-340M may be input into a weighted voter 345 that combines the labels using a weighted computation to obtain the output 315. Specifically, each of the decision trees 310A-310M may have a weight associated therewith. Higher the weight, greater is the impact of that decision tree on the output 315. The threshold, Tm,n discussed above, is stored in a memory associated with the decision tree system 300. In conventional decision trees, the same bit precision (e.g., eight bits) is used for all values of the threshold, Tm,n. Using the present disclosure, the optimization processor 185 may determine and assign non-uniform or optimized bit precision values to the threshold values of each of the decision trees 310A-310N based upon the relative importance of that particular decision tree. For example, if the decision tree 310A has a greater weight than the decision tree 310B, the optimization processor 185 associated with the decision tree system 300 may compute an optimized bit precision value for the thresholds of the decision tree 310A. In some embodiments, the memory controller may also compute the optimized bit precision values for the decision tree 310B. Further, the optimized bit precision values for the decision tree 310A may be greater than the optimized bit precision values of the decision tree 310B (since the decision tree 310A is more important than the decision tree 310B). Additionally, the thresholds of all the nodes in the decision tree 310B may have the same optimized bit precision value and the thresholds of all the nodes in the decision tree 310B may have the same optimized bit precision value, and so on. In some embodiments, the optimization processor 185 may also compute and apply the optimized bit precision values to the weights of each of the decision trees 310A-310M.

Based upon the optimized bit precision values, the optimization processor 185 may determine the optimized memory allocation for each of the decision trees 310A-310M. For example, the optimization processor 185 may allocate a greater amount of memory to the decision tree 310A than the amount of memory allocated to the decision tree 310B since the decision tree 310A is more important than the decision tree 310B in the example above. Thus, by determining optimized bit precision values and allocating memory based upon the optimized bit precision values, the output 315 may be more accurate.

Figure 4A:
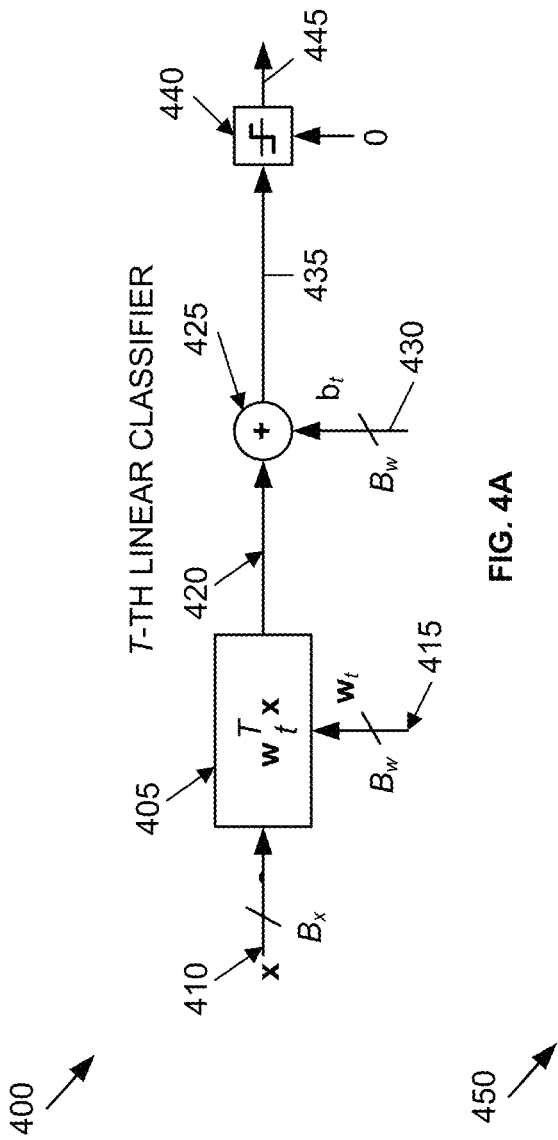
FIGS. 4A and 4B are example block diagrams showing an implementation of a linear classifier of the boosting algorithm of FIG. 1, in accordance with some embodiments of the present disclosure.
Figure 4B:
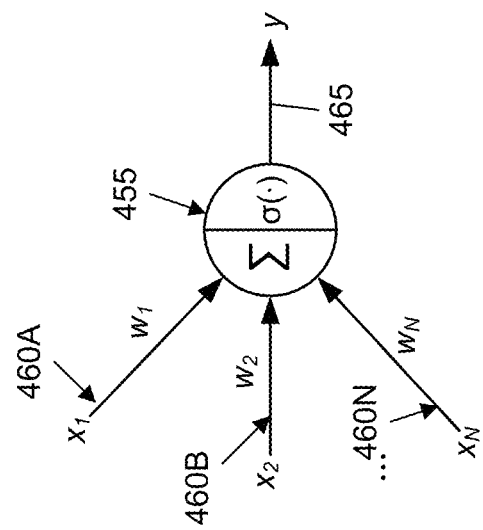

Referring now to FIGS. 4A and 4B, example single layer classifiers are shown, in accordance with some embodiments of the present disclosure. The single level classifiers of FIGS. 4A and 4B may be used in one or more of the weak classifiers 140A-140T of FIG. 1. The single level classifier of FIG. 4A is a support vector machine and the single level classifier of FIG. 4B is a single level neural network. Referring specifically to FIG. 4A, a support vector machine 400 includes a function 405 that computes $w_t^T x$, where x is a $B_x$-bit input data 410 and $w_t$ is a $B_w$-bit weight 415. T denotes a transpose of $w_t^T x$ such that:

$$w_t^T x = \sum_{d=1}^{D} w_{t,d} x_d$$

$B_x$ and $B_w$ represent the bit precision values of the input data 410 and the weight 415, respectively. Result 420 of the function 405 is input into a summation block 425 that performs the following operation:

$w_t^T x + b$ where b is the bias value 430.

Result 435 of the summation block 425 is input into a sign function 440 to generate a final output 445. In the support vector machine 400, values of the weight 415 and values of the bias value 430 may be stored within a memory associated with the support vector machine. By optimizing the bit precision values of the weight 415 and the bias value 430, the result 420 and the result 435, respectively, may be more accurately computed to obtain an overall more accurate value of the output 445. The optimized bit precision values for the weight 415 and the bias value 430 may be computed using Equations X-XIV above. In some embodiments, the optimized bit precision values for the weight 415 and the bias value 430 may be the same while in other embodiments, the optimized bit precision values for the weight and the bias value may be different. Based upon the optimized bit precision values, the memory allocation for storing the weight 415 and the bias value 430 may be optimized.

FIG. 4B shows an example of a single layer neural network 450. In the single layer neural network 450, a summation function 455 is applied to a plurality of data values and associated weight values 460A-460N. The summation function 455 may implement the following mathematical function to obtain output 465:

$y_t = \sigma(w_t^T x + b)$ where:
b is the bias value;
x is the data value;
wt is the weight value $$w_t^T x = \sum_{d=1}^{D} w_{t,d} x_d$$

The bit precision values of the weight values, wt, and the bias value, b, may be optimized as discussed herein. By optimizing the bit precision values of the weight values, wt, and the bias value, b, the output 465 may be more accurately computed.

Figure 5:
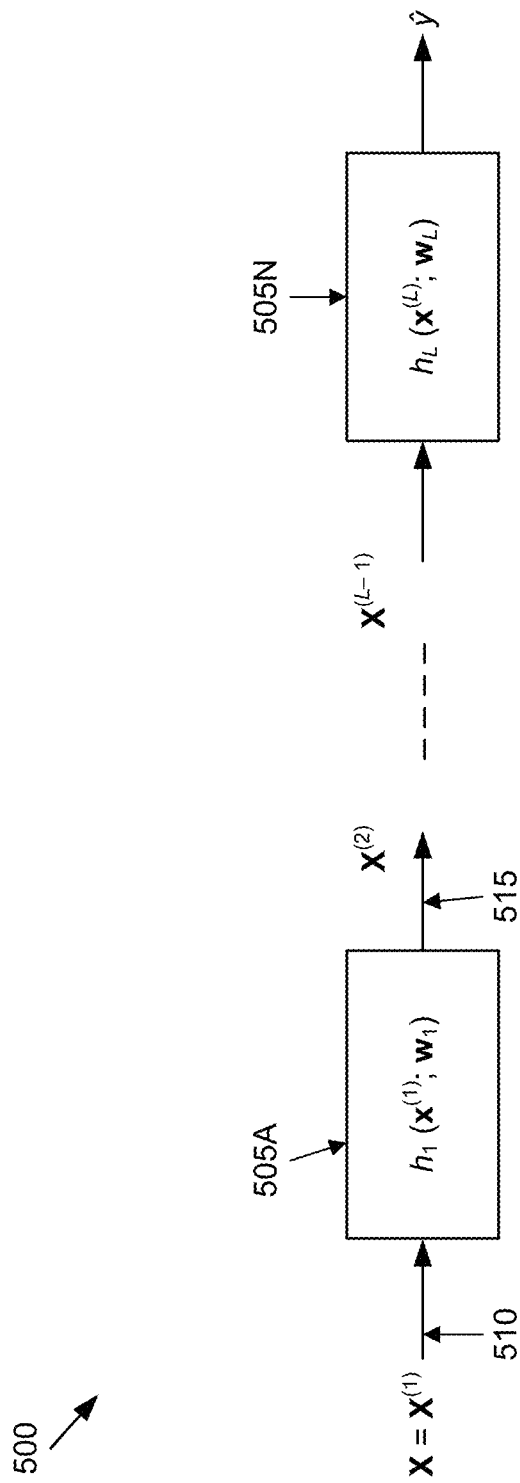
FIG. 5 is an example block diagram showing an implementation of a deep neural network of the boosting algorithm of FIG. 1, in accordance with some embodiments of the present disclosure.

Referring now to FIG. 5, an example multi-layer neural network or deep neural network 500 is shown, in accordance with some embodiments of the present disclosure. The deep neural network 500 includes multiple layers 505A-505N. Each of the layers 505A-505N receives an output from a previous layer as input or the input data as input. For example, the layer 505A receives input data 510 as input, the layer 505B receives output 515 of the layer 505A as input, and so on. Each of the layers 505A-505N is also associated with a weight value, w. For example, the layer 505A is associated with a weight value, w1, the layer 505B is associated with a weight value, w2, and son. Each of the layers 505A-505N implements the following mathematical function:

$$\sum_{d=1}^{D} w_{t,d}^{(l)} x_d + b_t^{(l)}$$

where:

$$w_t^{(l)} = (w_{t,1}^{(l)}, \ldots, w_{t,D}^{(l)}) \text{ and } x = (x_1, \ldots, x_D)$$

The superscript (l) denotes the layer index $b_t^{(l)}$ is the bias value and $w_t^{(l)}$ is the weight value.

As with the single layer neural network 450, the weight and bias values of the deep neural network 500 are stored in a memory array and the bit precision of the weight and bias values impacts the overall accuracy of the output of the deep neural network. By optimizing the bit precision values of the weight and bias values, as discussed herein, the overall output of the deep neural network 500 may be made more accurate.

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A control processor can synthesize a model for an FPGA. For example, the control processor can synthesize a model for logical programmable gates to implement a tensor array and/or a pixel array. The control channel can synthesize a model to connect the tensor array and/or pixel array on an FPGA, a reconfigurable chip and/or die, and/or the like. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:
   a processor to execute a plurality of classifiers, each classifier of the plurality of classifiers having a respective relative importance;
   a memory array;
   a memory controller to allocate memory from the memory array to each of the plurality of classifiers; and
   an optimization processor to determine an optimized bit precision value for at least one of the plurality of classifiers based upon the respective relative importance of the at least one of the plurality of classifiers, wherein the memory controller allocates the memory from the memory array to the at least one of the plurality of classifiers based upon the determined optimized bit precision value.

2. The system of claim 1, wherein the relative importance is determined based upon a weight assigned to each of the plurality of classifiers, wherein a first classifier of the plurality of classifiers having a first weight is more important than a second classifier of the plurality of classifiers having a second weight that is smaller than the first weight.

3. The system of claim 2, wherein the optimized bit precision value of the first classifier of the plurality of classifiers is greater than the optimized bit precision value of the second classifier of the plurality of classifiers.

4. The system of claim 1, wherein an amount of the memory allocated to a first classifier of the plurality of classifiers having a first optimized bit precision value is greater than the amount of the memory allocated to a second classifier of the plurality of classifiers having a second optimized bit precision value that is smaller than the first optimized bit precision value.

5. The system of claim 1, wherein the optimization processor determines the relative importance of the plurality of classifiers before determining the optimized bit precision value.

6. The system of claim 1, wherein the optimization processor determines an amount of the memory to be allocated to each of the plurality of classifiers based upon the optimized bit precision value.

7. The system of claim 6, wherein the optimization processor comprises a look-up table comprising the amount of the memory corresponding to the optimized bit precision value, wherein the optimized bit precision value is input into the look-up table to obtain the amount of the memory as an output of the look-up table.

8. The system of claim 1, wherein at least one of the plurality of classifiers is a decision tree.

9. The system of claim 1, wherein at least one of the plurality of classifiers is a linear classifier.

10. The system of claim 1, wherein at least one of the plurality of classifiers is a deep neural network.

11. The system of claim 1, wherein the plurality of classifiers are implemented in an adaptive bosting algorithm.

12. The system of claim 1, wherein the optimization processor determines the optimized bit precision value to minimize a mismatch probability between an output of an ideal memory allocation and the output of an actual memory allocation.

13. A method comprising:
    determining, by an optimization processor associated with a memory controller, a respective relative importance of each classifier of a plurality of classifiers;
    determining, by the optimization processor, an optimized bit precision value for at least one of the plurality of classifiers having high relative importance;
    determining, by the optimization processor, an optimized amount of memory for the at least one of the plurality of classifiers based on the optimized bit precision value; and
    allocating, by the memory controller, the optimized amount of memory from a memory array to the at least one of the plurality of classifiers.

14. The method of claim 13, further comprising determining the relative importance of the plurality of classifiers based upon a weight assigned to each of the plurality of classifiers, wherein a first classifier of the plurality of classifiers that has a first weight is more important than a second classifier of the plurality of classifiers that has a second weight that is smaller than the first weight.

15. The method of claim 14, wherein the optimized bit precision value of the first classifier is greater than the optimized bit precision value of the second classifier.

16. The method of claim 15, wherein the optimized amount of memory for the first classifier is greater than the optimized amount of memory for the second classifier.

17. The method of claim 13, wherein each of the plurality of classifiers is one of a decision tree, a single layer neural network, a support vector machine, or a deep neural network.

18. A non-transitory computer-readable media comprising computer-readable instructions stored thereon that when executed by an optimization processor cause the optimization processor to:
determine a first optimized bit precision value for a first classifier of an adaptive boosting algorithm based upon minimizing a first mismatch probability of the first classifier;
determine a second optimized bit precision value for a second classifier of the adaptive boosting algorithm based upon minimizing a second mismatch probability of the second classifier;
allocate a first amount of memory to the first classifier based on the first optimized bit precision value; and
allocate a second amount of memory to the second classifier based on the second optimized bit precision value,
wherein the first classifier has a first relative importance, the second classifier has a second relative importance and the first relative importance is greater than the second relative importance;
wherein the first optimized bit precision value is greater than the second optimized bit precision value; and
wherein the first amount of memory is greater than the second amount of computational resource.

19. The non-transitory computer-readable media of claim 18, wherein.

20. The non-transitory computer-readable media of claim 18, wherein a weight assigned to the first classifier is greater than the weight assigned to the second classifier.

21. A memory device comprising:
a memory array;
a memory controller to allocate memory from the memory array to each of a plurality of classifiers, each classifier of the plurality of classifiers having a respective relative importance that is determined based on a respective weight assigned to each of the plurality of classifiers; and
an optimization processor to determine an optimized bit precision value for at least one of the plurality of classifiers based upon the relative importance of the at least one of the plurality of classifiers, wherein the memory controller allocates the memory from the memory array to the at least one of the plurality of classifiers based upon the determined optimized bit precision value.

22. The memory device of claim 21, wherein a first classifier of the plurality of classifiers having a first weight is more important than a second classifier of the plurality of classifiers having a second weight that is smaller than the first weight.

23. The memory device of claim 22, wherein the optimized bit precision value of the first classifier of the plurality of classifiers is greater than the optimized bit precision value of the second classifier of the plurality of classifiers.

24. The memory device of claim 21, wherein an amount of the memory allocated to a first classifier of the plurality of classifiers having a first optimized bit precision value is greater than the amount of the memory allocated to a second classifier of the plurality of classifiers having a second optimized bit precision value that is smaller than the first optimized bit precision value.

25. The memory device of claim 21, wherein the optimization processor determines the optimized bit precision value to minimize a mismatch probability between an output of an ideal memory allocation and the output of an actual memory allocation.

26. The memory device of claim 21, further comprising a processor to execute the plurality of classifiers.

* * * * *